July 23, 1946. W. FOWLKES 2,404,370
FLOWER AND PLANT CONTAINER
Filed Aug. 11, 1943

Inventor
William Fowlkes
By Clarence A. O'Brien
and Harvey B. Jacobson
Attorneys Patented July 23, 1946

2,404,370

UNITED STATES PATENT OFFICE 2,404,370

FLOWER AND PLANT CONTAINER

William Fowlkes, Casper, Wyo.

Application August 11, 1943, Serial No. 498,237

1 Claim. (Cl. 47—34)

The present invention relates to new and useful improvements in flower and plant containers or pots and has for its primary object to provide a device of this character comprising a novel construction and arrangement whereby surplus moisture may be readily drained, thus preventing the soil from souring in addition to permitting free passage of oxygen to the roots of the young plants.

Other objects of the invention are to provide a flower and plant container of the aforementioned character which will be comparatively simple in construction, strong, durable, highly efficient and reliable in use, attractive in appearance and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein.

Figure 1:
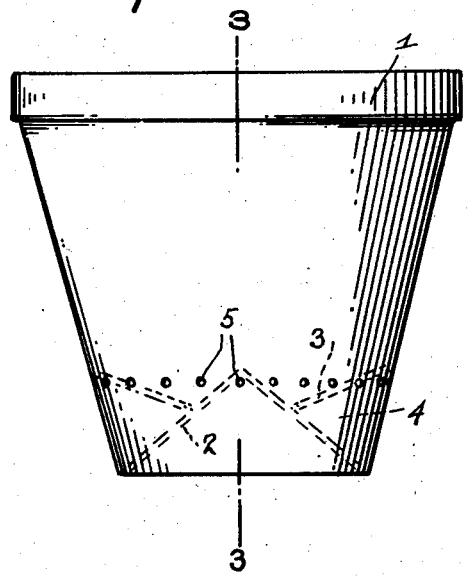
Figure 1 is an elevational view of a flower and plant container constructed in accordance with the present invention.
Figure 2:
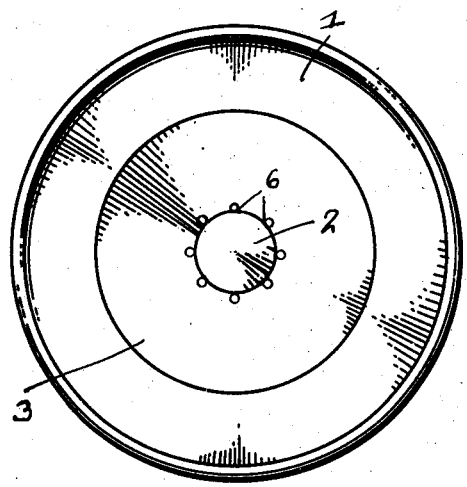
Figure 2 is a top plan view of the device.

Referring now to the drawing in detail, it will be seen that the embodiment of the invention which has been illustrated comprises a pot 1 of suitable material. The pot 1 includes a body which tapers downwardly and may be of any desired dimensions. The body of pot 1 has formed integrally therewith a substantially conical bottom 2.

Above the bottom 2, the pot 1 also has formed integrally therein an inverted, substantially frusto-conical false bottom 3. The portions 2 and 3 of the pot define an annular air chamber 4 in the lower portion of said pot.

Figure 3:
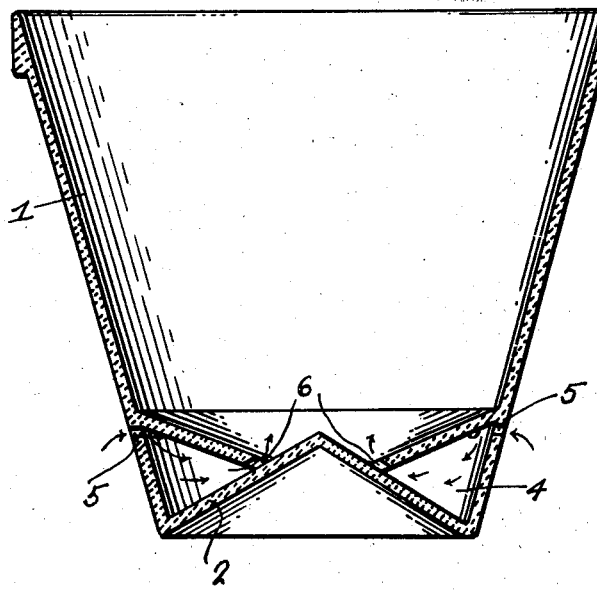
Figure 3 is a vertical sectional view, taken substantially on the line 3—3 of Figure 1.

The upper portion of the bottom 2 of the pot 1 projects through the central portion of the false bottom 3 which is open. This is shown to advantage in Figure 3 of the drawing.

Immediately below the false bottom 3, the pot 1 has formed therein a plurality of circumferentially spaced water outlet and air inlet openings or perforations 5, which communicate with the chamber 4. Around the conical bottom 2 of the pot 1, the false bottom 3 has formed therein a plurality of openings or perforations 6 which establish communication between said pot and the chamber 4, said openings 6 being also for the passage of air and water.

It is thought that the manner in which the container functions will be readily apparent from a consideration of the foregoing. Excess moisture in the pot 1 drains through the openings 6 into the chamber 4 where it may accumulate and from which it may be readily poured through the openings 5. Air from the atmosphere is free to enter the chamber 4 through the openings 5, said air then passing through the openings 6 into the lower portion of the pot 1. By ventilating and draining excess moisture from the lower portion of the pot, souring of the soil is prevented and the growth of strong, vigorous plants is promoted.

It is believed that the many advantages of a flower and plant container constructed in accordance with the present invention will be readily understood and although a preferred embodiment of the device is as illustrated and described, it is to be understood that changes in the details of construction may be resorted to which will fall within the scope of the invention as claimed.

What is claimed is:

A flower pot comprising a downwardly tapering hollow body of inverted frusto conical form open at the top and having an imperforate conical bottom wall, the lower outer edge of the bottom wall merging with the bottom edge of the body, a false bottom wall of inverted frusto conical form integral with and extending inwardly and downwardly from the lower portion of the body at a point spaced above the outer edge of the conical bottom wall and the lower edge of the body, the inner edge of said false bottom wall joining with the conical bottom wall adjacent to but below the apex of the latter so as to define an annular chamber of triangular cross section between the false bottom and the outer portion of the conical bottom and the lower portion of the body, said false bottom having an annular series of openings therein at the juncture thereof with the conical bottom to afford communication between the space within the body above the false bottom and said annular chamber, the body having a circumferential series of openings therein directly below the juncture of the false bottom with said body.

WILLIAM FOWLKES.